United States Patent
Kotake

(10) Patent No.: US 11,376,697 B2
(45) Date of Patent: Jul. 5, 2022

(54) TOOL HOLDING DEVICE AND MACHINE TOOL

(71) Applicants: CITIZEN WATCH CO., LTD., Tokyo (JP); CITIZEN MACHINERY CO., LTD., Nagano (JP)

(72) Inventor: Kyota Kotake, Saitama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 126 days.

(21) Appl. No.: 16/772,779

(22) PCT Filed: Jul. 6, 2018

(86) PCT No.: PCT/JP2018/025753
§ 371 (c)(1),
(2) Date: Jun. 13, 2020

(87) PCT Pub. No.: WO2019/123699
PCT Pub. Date: Jun. 27, 2019

(65) Prior Publication Data
US 2020/0331072 A1  Oct. 22, 2020

Related U.S. Application Data

(60) Provisional application No. 62/610,093, filed on Dec. 22, 2017.

(51) Int. Cl.
*B23Q 39/02* (2006.01)
*B23Q 1/70* (2006.01)
(Continued)

(52) U.S. Cl.
CPC .............. *B23Q 1/70* (2013.01); *B23B 3/065* (2013.01); *B23C 1/04* (2013.01); *B23Q 3/12* (2013.01);
(Continued)

(58) Field of Classification Search
CPC ........ B23Q 2039/002; B23Q 2039/006; B23Q 2039/004; B23Q 39/02–027;
(Continued)

(56) References Cited

U.S. PATENT DOCUMENTS

| 1,700,975 A | 2/1929 | Buhr |
| 3,635,570 A * | 1/1972 | DeGelleke ............ B23B 39/167 |
|  |  | 408/43 |

(Continued)

FOREIGN PATENT DOCUMENTS

| CN | 103286328 A | 9/2013 |
| CN | 105579192 A | 5/2016 |

(Continued)

OTHER PUBLICATIONS

Taiwan Patent Office, Taiwanese Search Report for Taiwanese Patent Application No. 107124651, dated Dec. 3, 2021.
(Continued)

*Primary Examiner* — Erica E Cadugan

(57) ABSTRACT

The tool holding device includes: a casing including a first surface, a second surface opposed to the first surface, and a first projection and a second projection projecting opposite to the first surface from the second surface; a first tool holding part disposed on the first surface at a position opposed to the first projection; a second tool holding part disposed on the first surface at a position opposed to the second projection; a driving-force input unit disposed at the end of the first projection and rotated by driving force being inputted; a first shaft extending in an axial direction perpendicular to the first surface and the second surface, the driving-force input unit and the first tool holding part being disposed at one end and the other end of the first shaft, respectively; a second shaft extending in the axial direction and having one end housed in the second projection, the second tool holding part being disposed at the other end of (Continued)

the second shaft; and a rotation transmitting unit rotating the second shaft in response to rotation of the first shaft.

3 Claims, 14 Drawing Sheets

(51) Int. Cl.
| | |
|---|---|
| *B23Q 5/10* | (2006.01) |
| *B23B 11/00* | (2006.01) |
| *B23B 29/26* | (2006.01) |
| *B23B 39/16* | (2006.01) |
| *B23Q 3/12* | (2006.01) |
| *B23B 3/06* | (2006.01) |
| *B23C 1/04* | (2006.01) |
| *B23Q 39/00* | (2006.01) |

(52) U.S. Cl.
CPC ............ *B23Q 39/024* (2013.01); *B23Q 5/10* (2013.01); *B23Q 2039/006* (2013.01); *Y10T 29/5114* (2015.01)

(58) Field of Classification Search
CPC .. B23Q 39/04; B23Q 1/70; B23Q 2003/1558; Y10T 408/36–385; Y10T 409/307168; Y10T 409/307784; Y10T 409/308344; Y10T 409/308568; Y10T 409/309296; Y10T 409/30448; B23C 1/04; B23C 1/045; B23C 1/08; B24B 27/0023; B23B 39/16–39/24; B23B 29/244; B23B 29/246; B23B 39/161; B23B 39/167; B23B 39/162; B23B 39/18
USPC .... 408/31–53; 409/192, 203, 213, 217, 230, 409/144
See application file for complete search history.

(56) References Cited

U.S. PATENT DOCUMENTS

| | | | | | |
|---|---|---|---|---|---|
| 3,765,787 | A | * | 10/1973 | Hart | ...................... B23B 39/162 409/231 |
| 5,471,724 | A | * | 12/1995 | Susnjara | ............... B23B 39/167 29/53 |
| 6,412,156 | B1 | * | 7/2002 | Yunokawa | ............ B23B 39/161 409/203 |
| 7,165,302 | B2 | * | 1/2007 | Kikkawa | .................. B23Q 1/70 409/230 |
| 8,128,323 | B2 | * | 3/2012 | Conroy | .............. B23Q 11/1015 409/230 |
| 2014/0033490 | A1 | | 2/2014 | Shimizu et al. | |
| 2016/0167187 | A1 | | 6/2016 | Burkhardt et al. | |
| 2018/0207732 | A1 | * | 7/2018 | Kosugi | ................. B23B 39/168 |
| 2021/0308774 | A1 | * | 10/2021 | Kotake | .................. B23B 29/24 |

FOREIGN PATENT DOCUMENTS

| | | | |
|---|---|---|---|
| CN | 106392113 | A | 2/2017 |
| DE | 1752463 | A1 | 11/1971 |
| DE | 2205285 | A1 | 10/1972 |
| DE | 10124084 | A1 * | 12/2001 |
| JP | S60-228004 | A | 11/1985 |
| JP | 03-142144 | A * | 6/1991 |
| JP | H05-037430 | U | 5/1993 |
| JP | H06-226519 | A | 8/1994 |
| JP | 08-300208 | A * | 11/1996 |
| JP | 2000-263305 | A * | 9/2000 |
| JP | 5579799 | B2 | 8/2014 |
| TW | M510805 | U | 10/2015 |
| TW | 201711795 | A | 4/2017 |
| WO | 2014/087491 | A1 | 6/2014 |

OTHER PUBLICATIONS

European Patent Office, Extended European Search Report for European Patent Application No. EP 18 89 1871, dated Aug. 18, 2021.

WIPO, International Search Report for International Application No. PCT/JP2018/025753, dated Oct. 9, 2018.

WIPO, International Preliminary Report for Patentability and Written Opinion for International Application No. PCT/JP2018/025753, dated Oct. 9, 2018.

* cited by examiner

PRIOR ART

PRIOR ART

TOOL HOLDING DEVICE AND MACHINE TOOL

FIELD

The present invention relates to a tool holding device for holding a tool, and a machine tool including such a tool holding device.

BACKGROUND

It is known to rotate two rotary tools in a machine tool in response to rotation of a single driving shaft. For example, as shown in FIG. 1, Patent Literature 1 describes that two rotating shafts, i.e., a rotating shaft 901 for front machining and a rotating shaft 902 for side machining which extends perpendicular to the rotating shaft 901 are rotated in response to rotation of a single driving shaft. As shown in FIG. 2, Patent Literature 2 describes that two tool rotating shafts 913 are meshably connected to a transmission rotating shaft 912 provided in the middle of an outer surface of a turret 911, and that the tool rotating shafts 913 are disposed on the outer surface of the turret 911 to rotate two rotary tools 914.

CITATION LIST

Patent Literature

Patent Literature 1: Japanese Unexamined Utility Model Publication 5-37430
Patent Literature 2: Japanese Patent No. 5579799

SUMMARY

Technical Problem

In the tool holding device described in Patent Literature 1, since the rotating shaft for front machining and the rotating shaft for side machining are perpendicular to each other, it is not easy to hold two rotary tools in the same direction. In the tool holding device described in Patent Literature 2, the two rotary tools can be rotated in the same direction; however, since the turret and the two tool rotating shafts for rotating the rotary tools are disposed so as not to come into contact with each other, it is not possible to extend the tool rotating shafts sufficiently long. Since the tool rotating shafts in the tool holding device described in Patent Literature 2 cannot be extended sufficiently long, it may be difficult to stably hold the rotary tools to machine a workpiece with high accuracy. Accordingly, it is an object of the present invention to provide a tool holding device and a machine tool which stably hold a plurality of rotary tools disposed in the same direction.

Solution to Problem

According to an embodiment, the tool holding device includes: a first shaft having one end at which a first tool holding part is disposed; a second shaft having one end at which a second tool holding part is disposed; a first bearing holding the first shaft rotatably; a second bearing disposed between the first tool holding part and the first bearing, the second bearing holding the first shaft rotatably; a third bearing holding the second shaft rotatably; a fourth bearing disposed between the second tool holding part and the third bearing, the fourth bearing holding the second shaft rotatably; a casing housing the first shaft, the second shaft, the second bearing and the fourth bearing; a first projection projecting from the casing and housing the first bearing; and a second projection projecting from the casing and housing the third bearing.

According to an embodiment, the tool holding device preferably further includes a driving-force input unit rotating the first shaft by driving force being inputted, and a rotation transmitting unit rotating the second shaft in response to rotation of the first shaft.

According to an embodiment, in the tool holding device, the first projection preferably has a longer length than the second projection.

According to an embodiment, the machine tool includes a driving-force output unit outputting driving force, a tool holding stand having a first recess and a second recess, and a tool holding device engaged with the tool holding stand and holding a plurality of rotary tools disposed in the same direction, wherein the tool holding device includes: a casing including a first surface, a second surface opposed to the first surface, and a first projection and a second projection projecting opposite to the first surface from the second surface, the first projection and the second projection being housed in a first recess and a second recess, respectively; a first tool holding part disposed on the first surface at a position opposed to the first projection; a second tool holding part disposed on the first surface at a position opposed to the second projection; a driving-force input unit disposed at the end of the first projection and rotated by driving force inputted from the driving-force output unit; a first shaft extending in an axial direction perpendicular to the first surface and the second surface, the driving-force input unit and the first tool holding part being disposed at one end and the other end of the first shaft, respectively; a second shaft extending in the axial direction and having one end housed in the second projection, the second tool holding part being disposed at the other end of the second shaft; and a rotation transmitting unit rotating the second shaft in response to rotation of the first shaft.

Advantageous Effects of Invention

The tool holding device and the machine tool according to the present invention can easily hold a plurality of rotary tools disposed in the same direction with stability.

DESCRIPTION OF EMBODIMENTS

Hereinafter, with reference to the accompanying drawings, a tool holding device and a machine tool according to an exemplary embodiment will be explained in detail. However, the technical scope of the present invention is not limited to embodiments thereof. In the explanation of the drawings, the same symbols are attached to the same or corresponding elements, and duplicated explanation is omitted. The scale of the drawings is appropriately changed for explanation.

The tool holding device according to an embodiment includes a first shaft rotated by driving force inputted to a driving-force input unit to rotate a first tool holding part, a second shaft extending in parallel with the first shaft and rotating in response to rotation of the first shaft to rotate a second tool holding part, and a casing housing the first shaft and the second shaft. The second shaft has one end housed in a second projection projecting from a second surface of the casing. In the tool holding device according to the embodiment, since the one end of the second shaft is housed in a second projection projecting from a second surface of the casing, the second shaft can be extended in accordance with the length of the second projection. In the tool holding device according to the embodiment, since the second shaft can be extended in accordance with the length of the second projection, the rotating second shaft is steadied, which allows for improving the accuracy of machining a workpiece with a tool held by the second tool holding part disposed at the other end of the second shaft.

(Tool Holding Device and Machine Tool According to an Embodiment)

Figure 1:
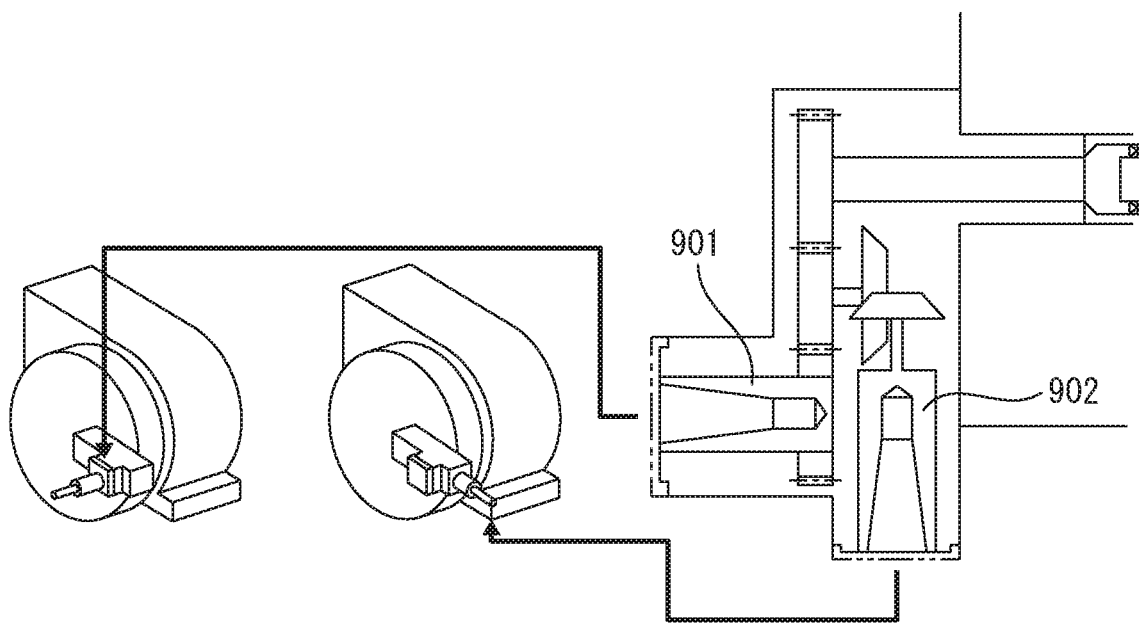
FIG. 1 shows prior art (part 1).
Figure 2:
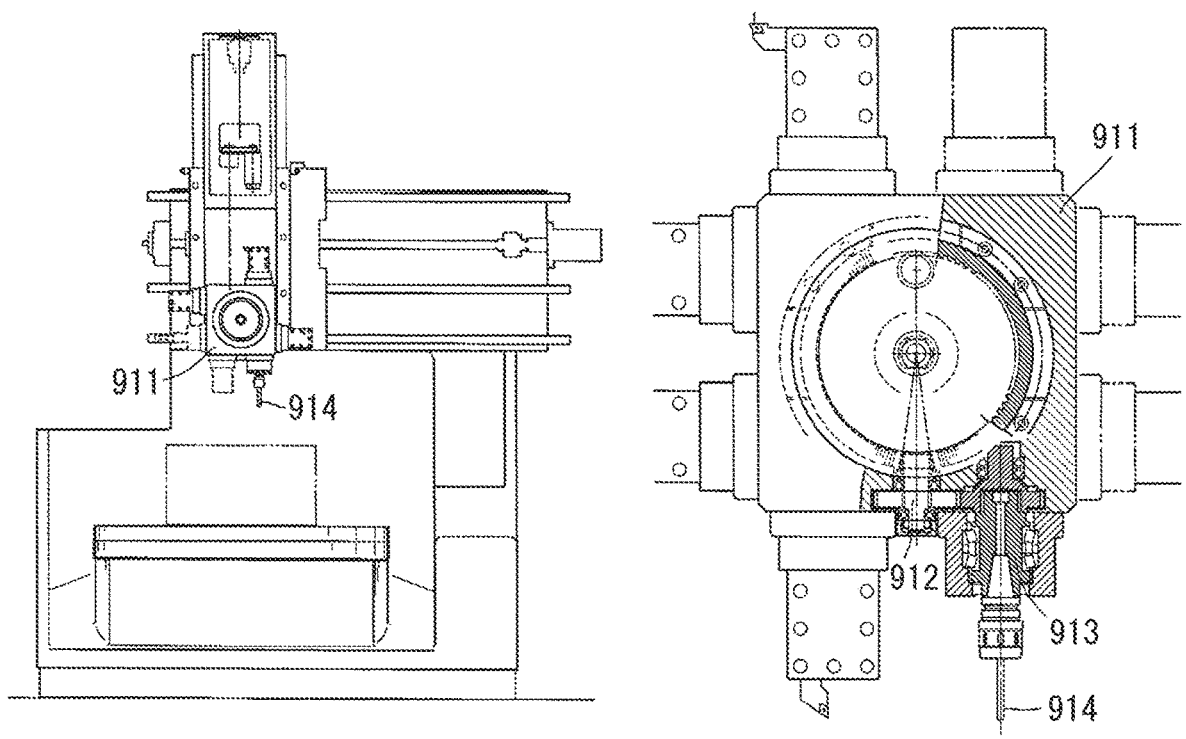
FIG. 2 shows prior art (part 2).
Figure 3:
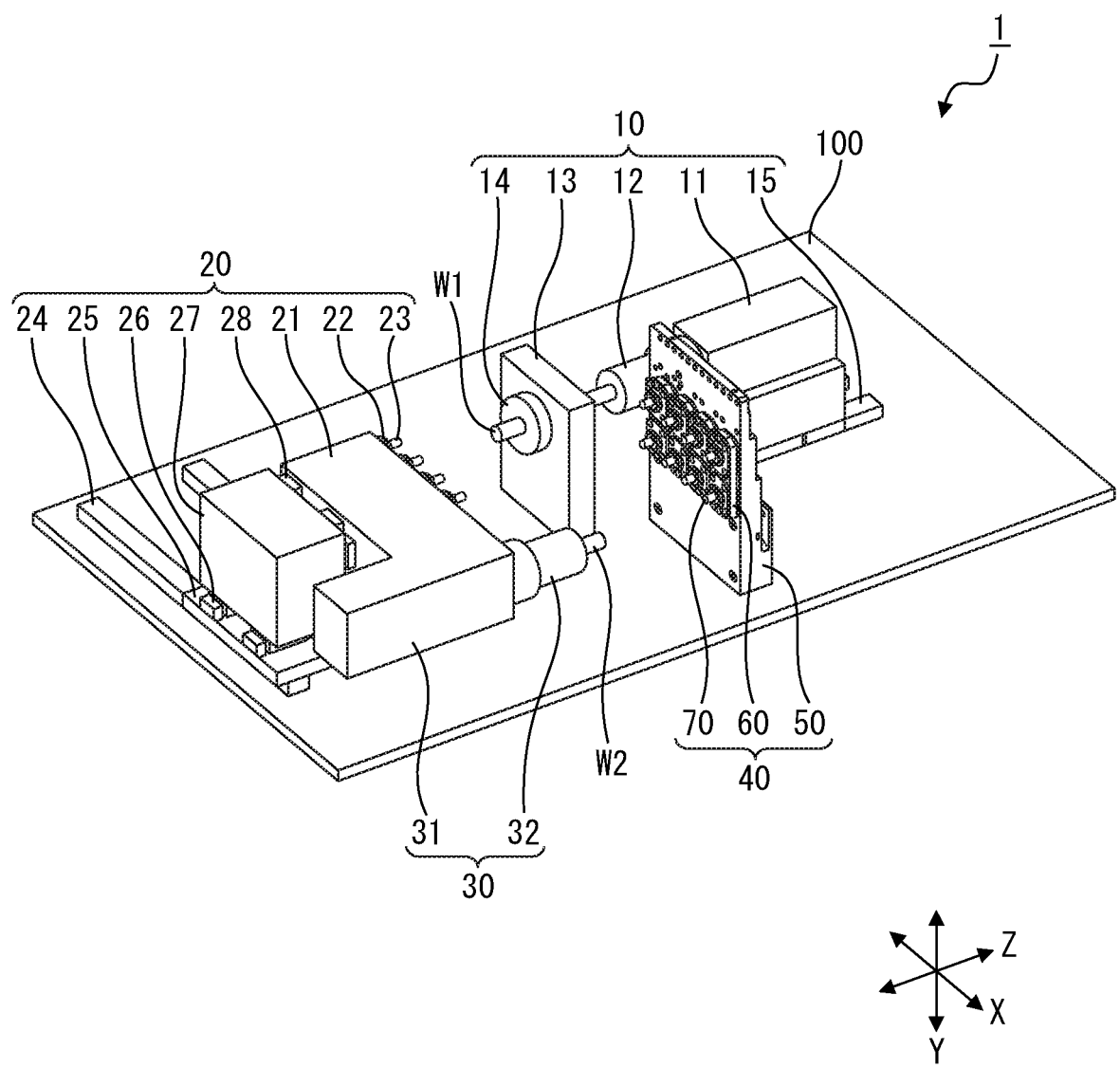
FIG. 3 is a perspective view of a machine tool according to an embodiment.

FIG. 3 is a schematic perspective view of a machine tool according to an embodiment.

The machine tool 1 includes a front spindle part 10, a front tool holding part 20, a rear spindle part 30 and a rear tool holding part 40. The front spindle part 10, the front tool holding part 20, the rear spindle part 30 and the rear tool holding part 40 are mounted on a flat-shaped base 100.

The front spindle part 10 includes a front headstock 11, a front spindle 12, a guide bush support 13, a guide bush 14 and spindle Z-axis rails 15, and holds a first workpiece W1 rotatably. The front headstock 11 is slidably supported by the spindle Z-axis rails 15, which extend in parallel with a Z direction (hereinafter, also referred to as an axial direction) in which the spindle extends. The Z position of the front headstock 11 is controlled by a numerical control (NC) device (not shown). The front spindle 12 is an axial member extending in the Z direction, and holds the first workpiece W1 at one end thereof. The front spindle 12 is mounted on the front headstock 11 so as to be rotationally driven. The front spindle 12 moves in the Z direction in response to the front headstock 11 moving in the Z direction. The guide bush support 13 is disposed between the front headstock 11 and the front tool holding part 20, and supports the guide bush 14. The guide bush 14 is supported by the guide bush support 13, and holds the first workpiece W1, which moves in the Z-axis direction together with the front spindle 12 during machining, in a rotatable and slidable manner, and guides the workpiece and prevents it from shaking. The spindle Z-axis rails 15 support the front headstock 11 so as to be slidable in the Z direction.

The front tool holding part 20 includes a front tool stand 21, a front tool holding device 22, front tools 23, tool X-axis rails 24, a tool X-axis sliding table 25, tool Z-axis rails 26, a tool Z-axis sliding table 27 and tool Y-axis rails 28. The X, Y and Z positions of the front tool stand 21 are controlled by a numerical control (NC) device (not shown). The front tool holding device 22 is supported by the front tool stand 21, and holds the front tools 23. The front tools 23 are tools for performing various kinds of machining on the first workpiece W1. The tool X-axis rails 24 support the tool X-axis sliding table 25 so as to be slidable in the X direction. The tool X-axis sliding table 25 supports the tool Z-axis rails 26. The tool Z-axis rails 26 support the tool Z-axis sliding table 27 so as to be slidable in the Z direction. The tool Z-axis sliding table 27 supports the tool Y-axis rails 28. The tool Y-axis rails 28 support the front tool stand 21 so as to be slidable in the Y direction. The front tool stand 21 is thus supported so as to be slidable in the X, Y and Z directions by the tool X-axis rails 24, the tool Z-axis rails 26 and the tool Y-axis rails 28.

The rear spindle part 30 includes a rear headstock 31 and a rear spindle 32, and holds a second workpiece W2 rotatably. The rear headstock 31 is integrated with the front tool stand 21, and is supported so as to be slidable in the X, Y and Z directions by the tool X-axis rails 24, the tool Z-axis rails 26 and the tool Y-axis rails 28. The rear spindle 32 is an axial member extending in the Z direction, i.e., the axial direction, and holds the second workpiece W2 at one end thereof. The rear spindle 32 is mounted on the rear headstock 31 so as to be rotationally driven. The rear spindle 32 moves in the X, Y and Z directions in response to the rear headstock 31 moving in the X, Y and Z directions.

The rear tool holding part 40 includes a rear tool stand 50, rear tool holding devices 60 and rear tools 70. The rear tool stand 50 is fixed to the base 100. The rear tool holding devices 60 are supported by the rear tool stand 50, and hold the rear tools 70. The rear tools 70 are rotary tools for performing various kinds of machining on the second workpiece W2.

Figure 4A:
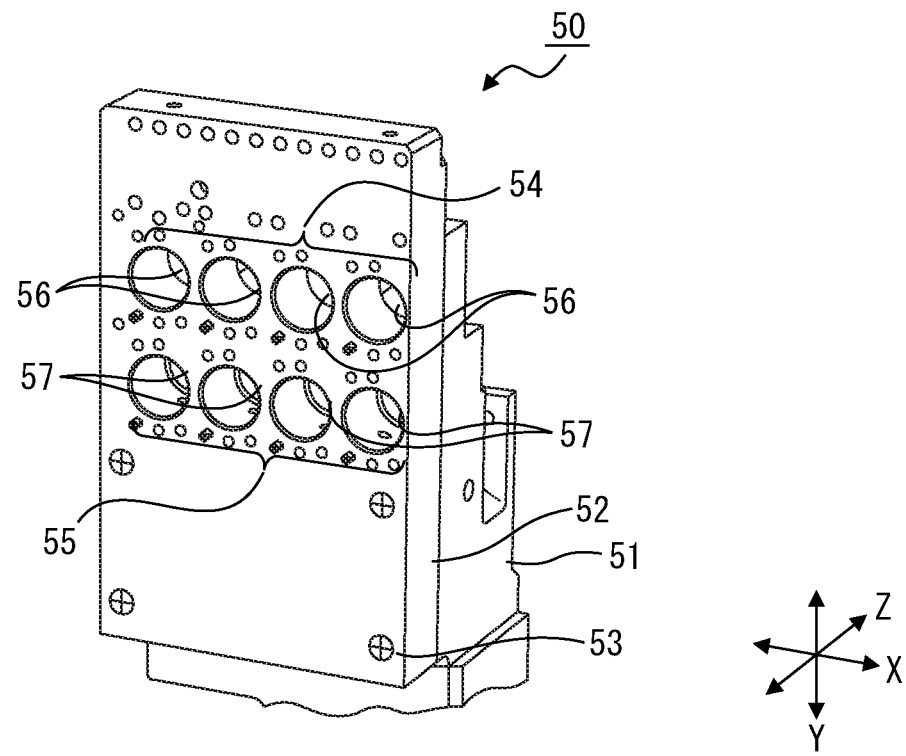
FIG. 4A is a partial perspective view of the rear tool stand without the rear tool holding devices shown in FIG. 3 being mounted thereon.
Figure 4B:
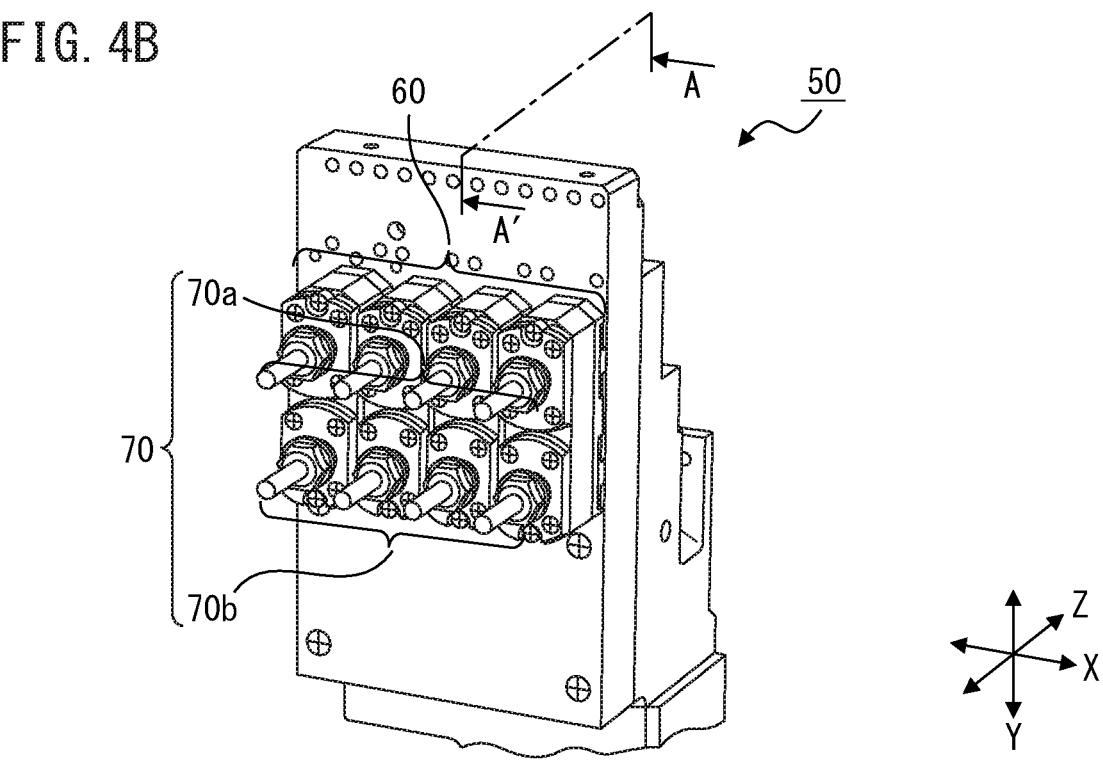
FIG. 4B is a partial perspective view of the rear tool stand with the rear tool holding devices shown in FIG. 3 being mounted thereon.

FIG. 4A is a partial perspective view of the rear tool stand 50 without the rear tool holding devices 60 being mounted thereon; FIG. 4B is a partial perspective view of the rear tool stand 50 with the rear tool holding devices 60 being mounted thereon.

The rear tool stand 50 includes a base 51 and a board 52. The base 51 is fixed to the base 100, while the board 52 is fixed to the base 51 by fastening members 53, such as screws. As an example, the board 52 has four through holes 54 and four blind holes 55. The four through holes 54 are cylindrical holes extending from one surface to the other surface of the board 52. The surface of the base 51 facing the through holes 54 has recesses 56. The four blind holes 55 are cylindrical recesses having circular bottom surfaces 57.

Figure 5:
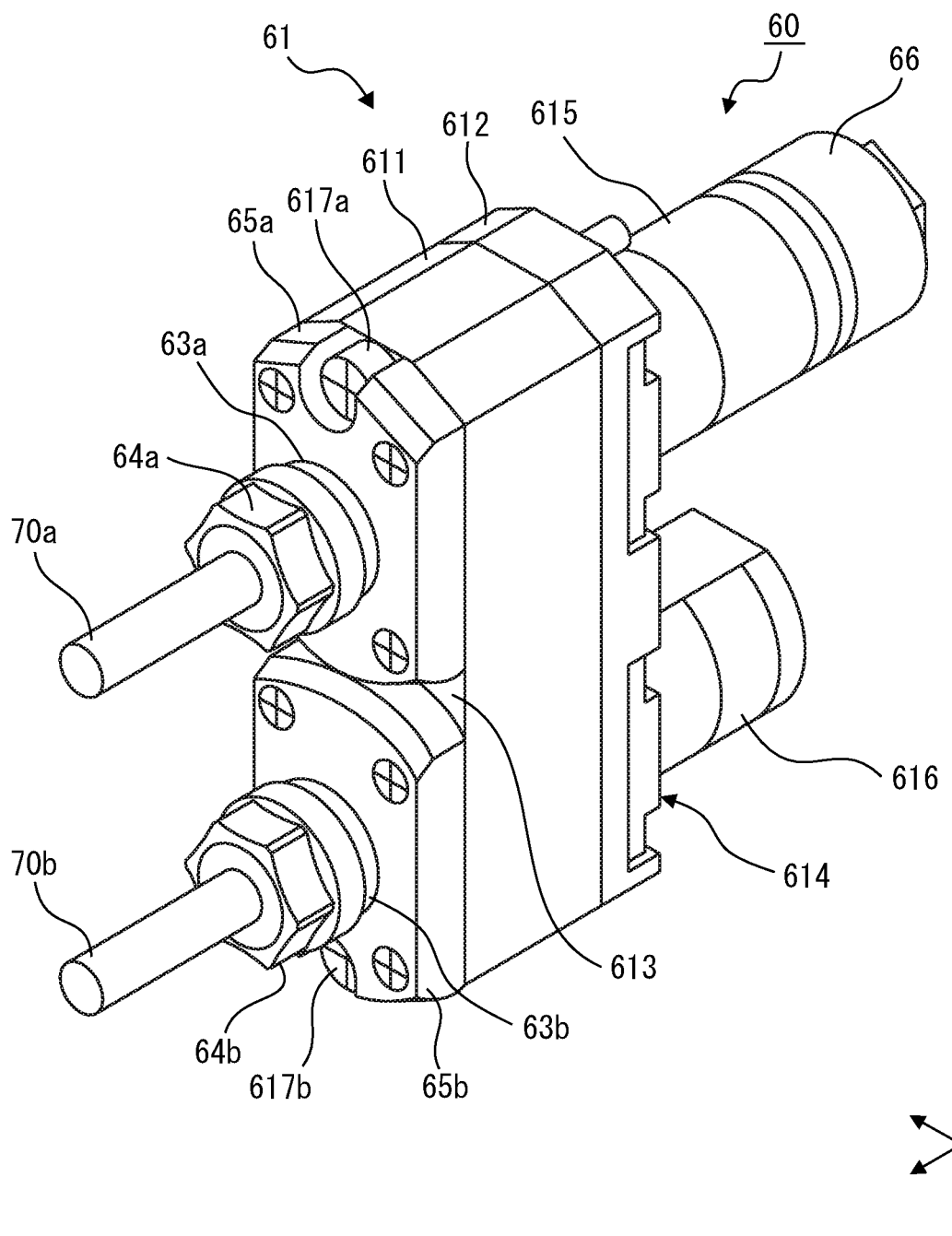
FIG. 5 is a perspective view of one of the rear tool holding devices.
Figure 6B:
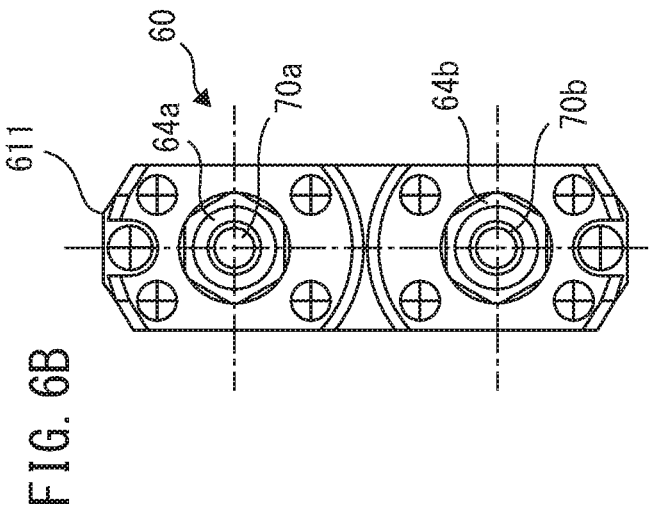
FIG. 6B is a front view of the rear tool holding device shown in FIG. 5.
Figure 6A:
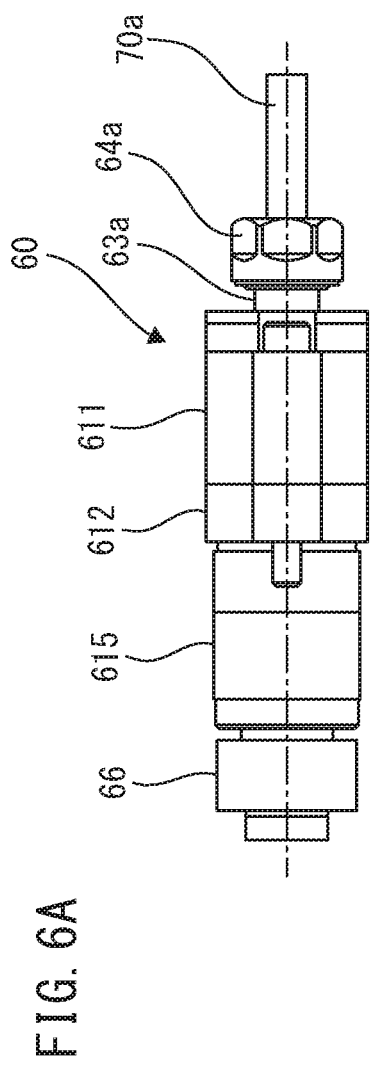
FIG. 6A is a plan view of the rear tool holding device shown in FIG. 5.
Figure 6C:
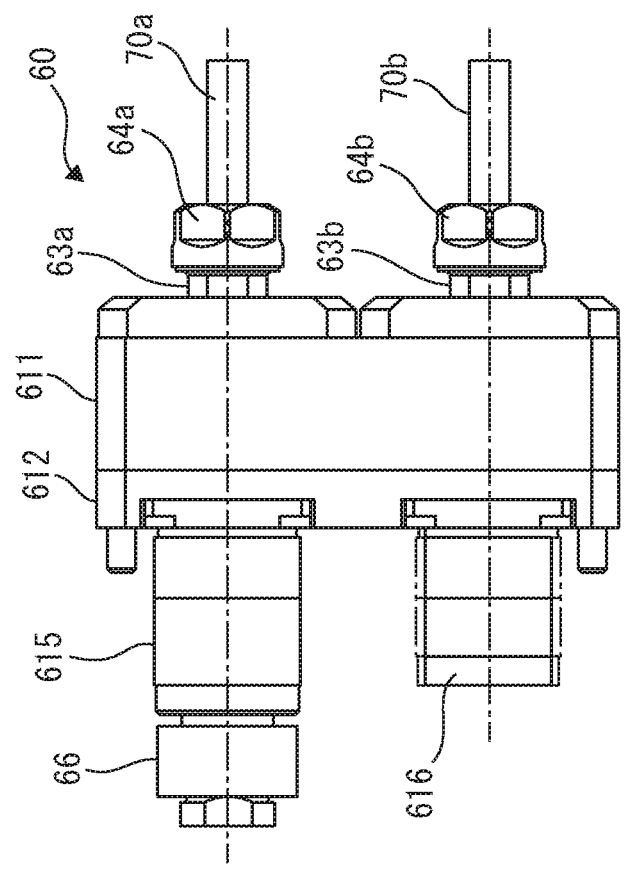
FIG. 6C is a side view of the rear tool holding device shown in FIG. 5.
Figure 7:
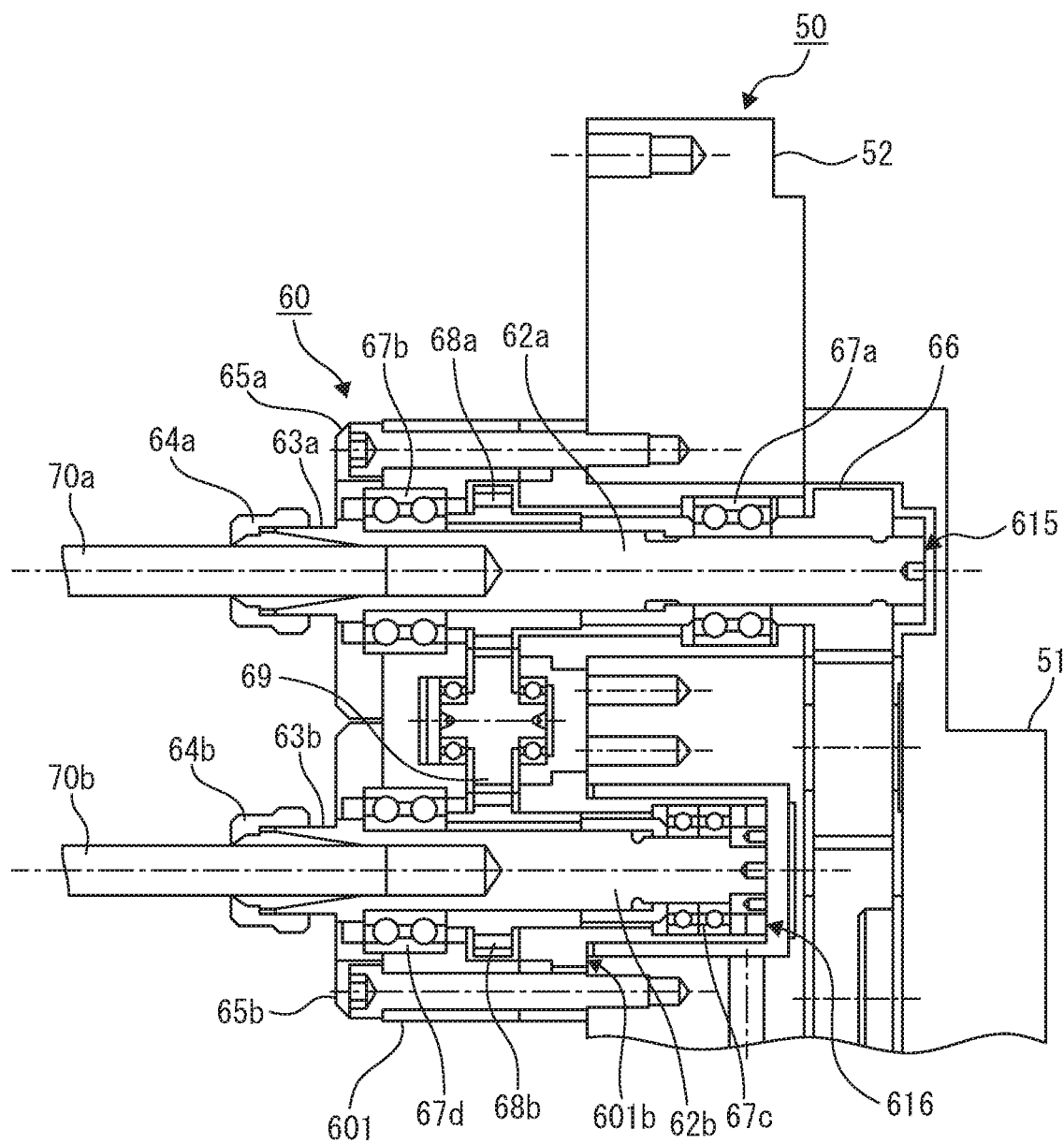
FIG. 7 shows a cross section taken along line A-A' in FIG. 4B.
Figure 7:
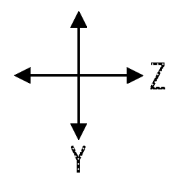

FIG. 5 is a perspective view of one of the rear tool holding devices 60. FIG. 6A is a plan view; FIG. 6B is a front view; and FIG. 6C is a side view. FIG. 7 shows a cross section taken along line A-A' in FIG. 4B.

Each of the rear tool holding devices 60 includes a casing 61, a first shaft 62a, a second shaft 62b, a first tool holding part 63a, a second tool holding part 63b, a first tightening member 64a, a second tightening member 64b, a first covering member 65a, a second covering member 65b and a driving-force input unit 66. Each of the rear tool holding devices 60 further includes a first projection 615 and a second projection 616.

The casing 61 includes a first body portion 611 and a second body portion 612. The first body portion 611 is a hollow member having a first surface 613 and pierced by the first shaft 62a and the second shaft 62b. The second body portion 612 is a hollow member having a second surface 614 opposed to the first surface; the hollow first projection 615 and second projection 616 project opposite to the first surface 613 from the second surface 614. The first body portion 611 and the second body portion 612 are fastened together by a first fastening member 617a and a second fastening member 617b.

The first shaft 62a is a stick-like member extending in the Z direction, i.e., the axial direction so as to pierce the body of the casing 61 between the first surface 613 and the second surface 614; the first tool holding part 63a and the driving-force input unit 66 are disposed at one end and the other end of the first shaft 62a, respectively, the other end being housed in the first projection 615. The second shaft 62b is a stick-like member extending in the axial direction so as to pierce the casing 61; the second shaft 62b has one end at which the second tool holding part 63b is disposed, and the other end housed in the second projection 616.

The first tool holding part 63a clamps an edge of a first rotary tool 70a to hold the first rotary tool 70a.

The second tool holding part 63b clamps an edge of a second rotary tool 70b to hold the second rotary tool 70b.

The first covering member 65a is disposed between the first body portion 611 and the first tool holding part 63a, and covers the hole pierced by the first shaft 62a. The second covering member 65b is disposed between the first body portion 611 and the second tool holding part 63b, and covers the hole pierced by the second shaft 62b.

The first tightening member 64a includes a chucking mechanism screwed into a thread formed on the first tool holding part 63a, and thereby fixes the first rotary tool 70a held by the first tool holding part 63a.

The second tightening member 64b includes a chucking mechanism screwed into a thread formed on the second tool holding part 63b, and thereby fixes a second rotary tool 70b held by the second tool holding part 63b.

Each of the rear tool holding devices 60 further includes a first bearing 67a, a second bearing 67b, a third bearing 67c, a fourth bearing 67d, a first gear 68a and a second gear 68b; and a driving-force transmitting member 80 is wound around the driving-force input unit 66. The first bearing 67a is housed in the first projection 615, and holds the first shaft 62a rotatably. The second bearing 67b is disposed between the first tool holding part 63a and the first bearing 67a, and holds the first shaft 62a rotatably. The third bearing 67c is housed in the second projection 616, and holds the second shaft 62b rotatably. The fourth bearing 67d is disposed between the second tool holding part 63b and the third bearing 67c, and holds the second shaft 62b rotatably.

The first gear 68a and the second gear 68b are gears disposed around the first shaft 62a and the second shaft 62b, respectively. The rotation transmitting unit 69 includes a gear fitted to the first gear 68a and the second gear 68b, and rotates the second shaft 62b in response to rotation of the first shaft 62a.

Figure 9:
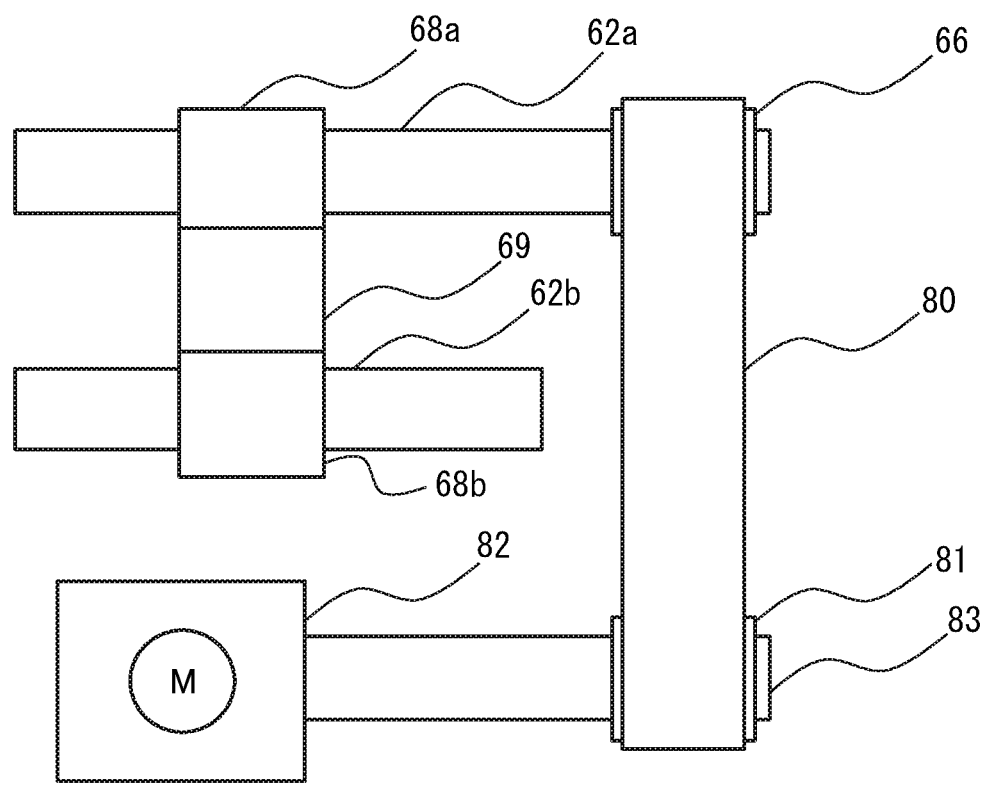
FIG. 9 shows a rotation mechanism rotating the first shaft and the second shaft shown in FIG. 7.

FIG. 9 schematically shows a rotation mechanism rotating the first shaft 62a and the second shaft 62b in FIG. 7.

The first shaft 62a rotates in response to rotation of the driving-force input unit 66 caused by driving force being inputted from a driving-force output unit 81 through the driving-force transmitting member 80, such as a rotary belt, to the driving-force input unit 66. The rotation of the first shaft 62a causes the first rotary tool 70a held by the first shaft 62a to rotate. The driving-force output unit 81 is connected through a driving shaft 83 to a driver 82 including a motor, and rotates in response to rotation of the motor included in the driver 82.

The first gear 68a rotates in response to rotation of the first shaft 62a. Upon rotation of the first gear 68a, the gear of the rotation transmitting unit 69 fitted to the first gear 68a rotates. Upon rotation of the gear of the rotation transmitting unit 69, the second gear 68b fitted to the gear of the rotation transmitting unit 69 rotates, causing the second shaft 62b to rotate. The rotation of the second shaft 62b causes the second rotary tool 70b held by the second shaft 62b to rotate.

Figure 8:
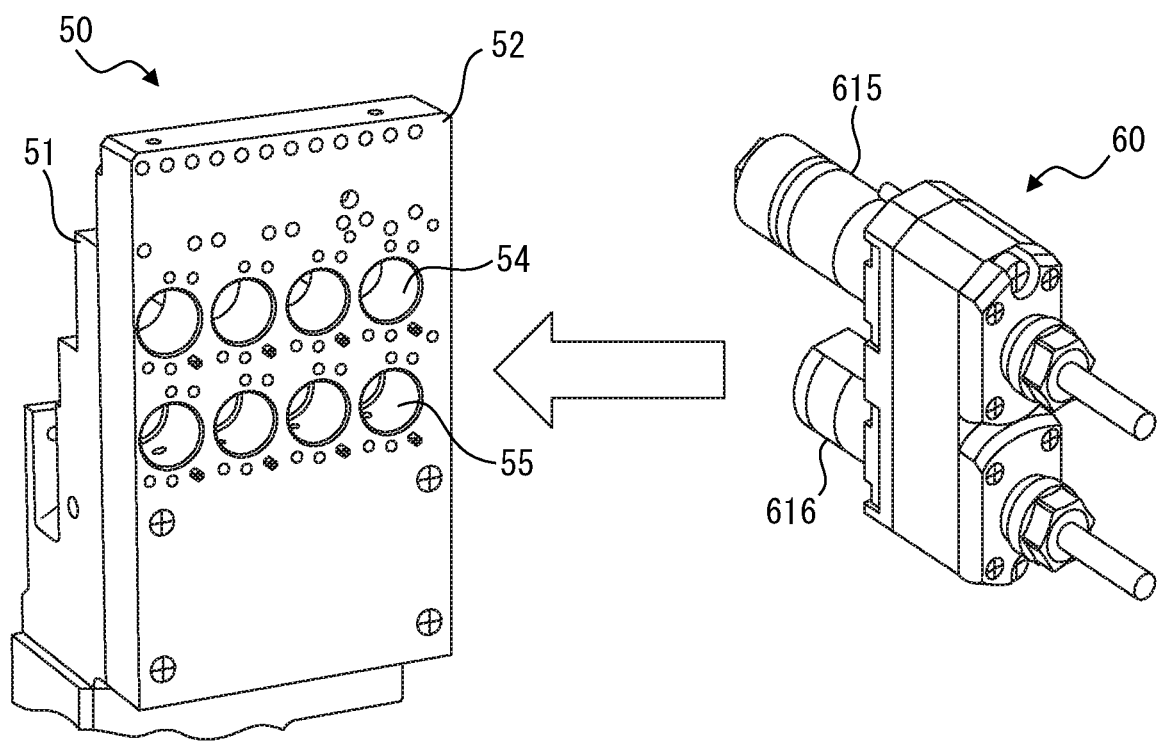
FIG. 8 shows how to engage the rear tool holding device shown in FIG. 5 with the rear tool stand shown in FIG. 3.

FIG. 8 shows how to attach the rear tool holding devices 60 to the rear tool stand 50.

Each of the four rear tool holding devices 60 is engaged with and attached to the rear tool stand 50 by being fastened to the rear tool stand 50 with fastening members, such as screws, with the first projection 615 and the second projection 616 being inserted and housed in the corresponding through hole 54 and blind hole 55, respectively. Each of the four rear tool holding devices 60 holds the first rotary tool 70a and the second rotary tool 70b out of the rear tools 70 at positions corresponding to the through hole 54 and the blind hole 55, respectively.

(Operational Advantages of the Tool Holding Device According to the Embodiment)

In the rear tool holding devices 60, since one end of the second shaft 62b is housed in the second projection 616 projecting from the second surface 614 of the casing, the second shaft 62b is extended in accordance with the length of the second projection 616. The features of the rear tool holding devices 60 that the first bearing 67a holding the first shaft 62a rotatably is housed in the first projection 615 and that the third bearing 67c holding the second shaft 62b rotatably is housed in the second projection 616 allow for extending the distance between the first bearing 67a housed in the first projection 615 and the second bearing 67b disposed in the body of the casing 61 and the distance between the third bearing 67c housed in the second projection 616 and the fourth bearing 67d disposed in the body of the casing 61. In the rear tool holding devices 60, since the distances between the bearings holding the first shaft 62a and the second shaft 62b rotatably can be extended, the respective shafts can be rotated stably.

The feature of the rear tool holding devices 60 that the first projection 615 has a longer length than the second projection 616 allows for disposing the second shaft 62b between the driving-force input unit 66 and the driving-force output unit. In the rear tool holding devices 60, since the second shaft 62b is disposed between the driving-force input unit 66 and the driving-force output unit, two rotary tools can be disposed on a tool stand of a machine tool where the blind holes 55 are placed below the through holes 54, as in the board 52.

The feature of the rear tool holding devices 60 that the first projection 615 and the second projection 616 are inserted into the corresponding through hole 54 and blind hole 55 allows two rotary tools to be stably held on a tool stand of a machine tool and stably driven by driving force inputted to the single driving-force input unit 66.

(Example where the Tool Holding Device According to the Embodiment is Mounted)

A description will be given below of an example of a machine tool on which the tool holding device according to the embodiment is mounted.

Figure 10:
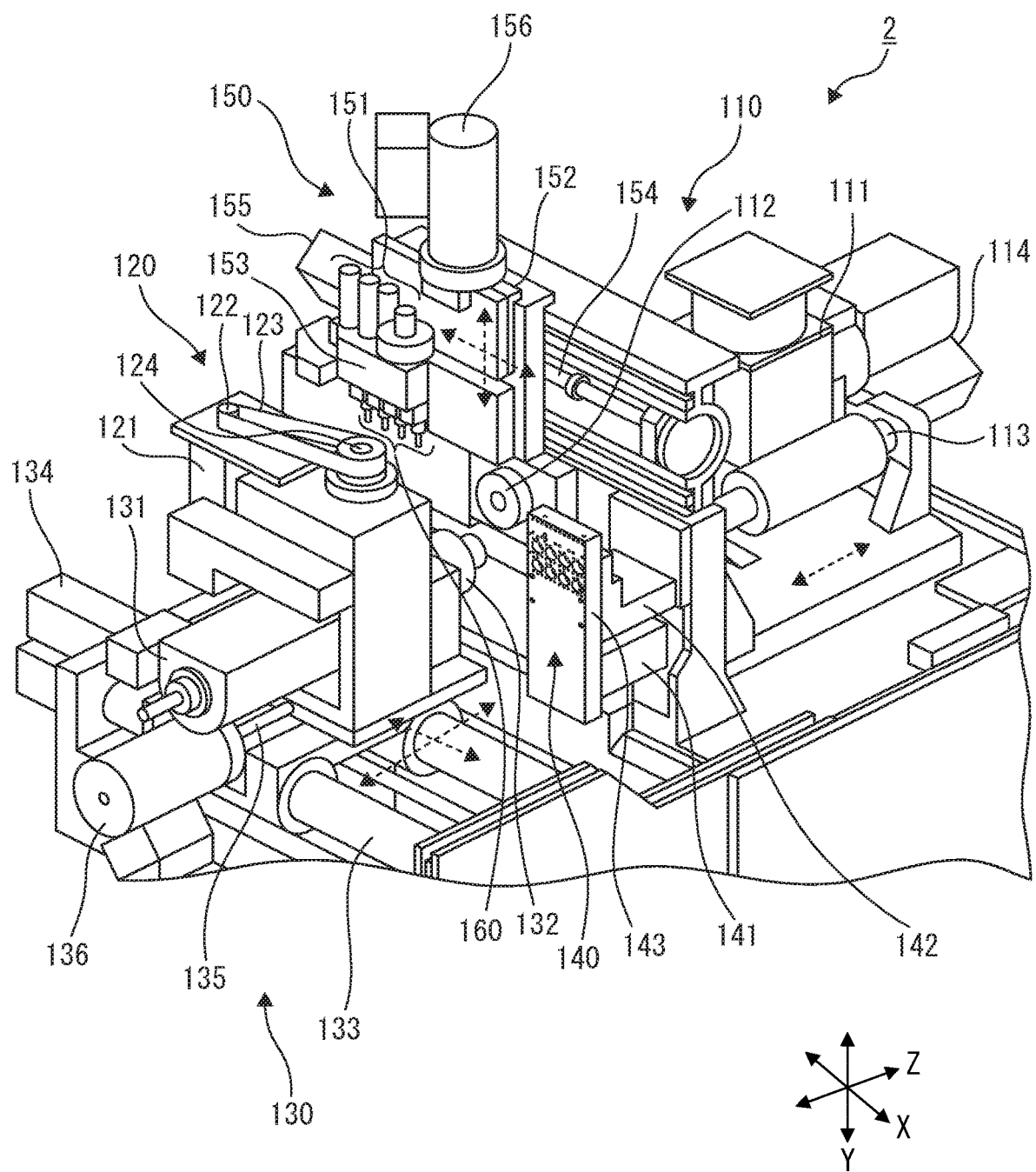
FIG. 10 shows an example of a machine tool on which the tool holding device according to the embodiment can be mounted.
Figure 11:
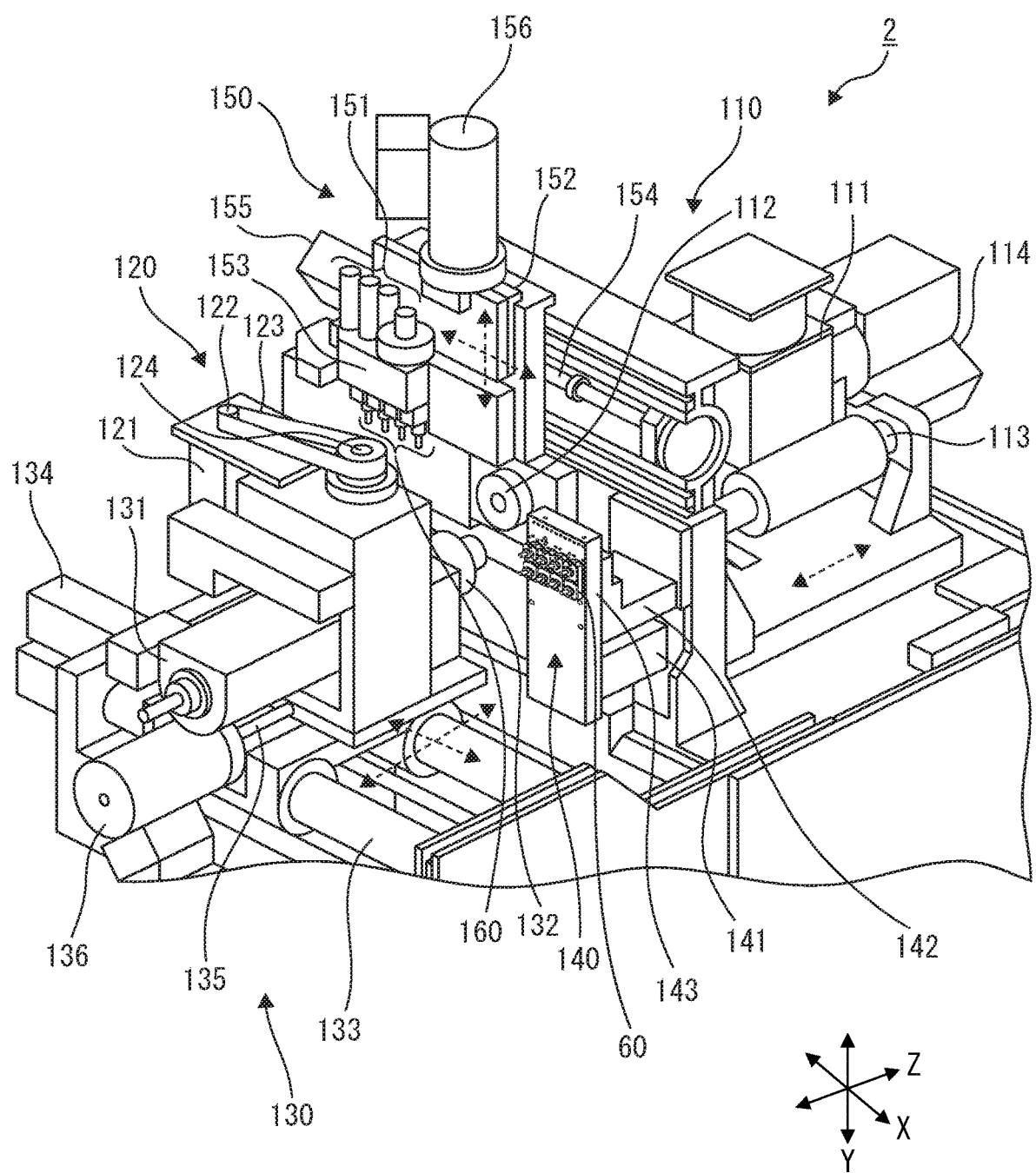
FIG. 11 shows the machine tool shown in FIG. 10 with the tool holding device according to the embodiment being mounted thereon.

FIG. 10 shows an example of a machine tool on which the rear tool holding devices 60 can be mounted; FIG. 11 shows the machine tool with the rear tool holding devices 60 being mounted thereon.

The front spindle part 110 of the machine tool 2 includes a front headstock 111 on which a front spindle is mounted so as to be rotationally driven, and a guide bush 112 holding a workpiece rotatably and slidably. The front headstock 111 is moved in the Z direction by a front spindle shifter 114 through front Z-axis rails 113 extending in the Z direction. The front spindle is rotated, for example, by an electric motor built in the front headstock 111.

The front tool holding part 120 includes an opposing cutter shifter 121, a first moving shaft 122, a movement transmitting member 123 and a second moving shaft 124. The opposing cutter shifter 121 includes an electric motor, and moves an opposing tool post and a rear spindle (not shown) in the Y direction through the first moving shaft 122, the movement transmitting member 123 and the second moving shaft 124.

The rear spindle part 130 includes a rear headstock 131 on which a rear spindle 132 is mounted so as to be rotationally driven. The rear headstock 131 is moved in the X and Z directions by a first rear spindle shifter 134 and a second rear spindle shifter 136 through rear X-axis rails 133 extending in the X direction and a rear Z-axis rail 135 extending in the Z direction. The rear headstock 131 includes an electric motor therein, and rotates the rear spindle.

The rear tool holding part 140 includes a rear tool device 141, a rear base 142 and a rear board 143. The rear tool device 141 includes an electric motor, and rotates the first shafts 62a and the second shafts 62b of the rear tool holding devices 60.

The tool post 150 of the machine tool 2 includes rotary devices 151 rotating rotary tools 160, a spindle holding part 152 holding spindles of the rotary tools movably, and a rotary tool holder 153 engaged with the spindles of the rotary tools and holding the rotary tools 160 rotatably. The tool post 150 further includes an X-axis rail 154 extending in the X direction and holding the spindle holding part 152 slidably, and an X-axis shifter 155 moving the spindle holding part 152 in the X direction. The tool post 150 further includes a Y-spindle shifter 156 moving the spindle holding part 152 in the Y direction.

Figure 12:
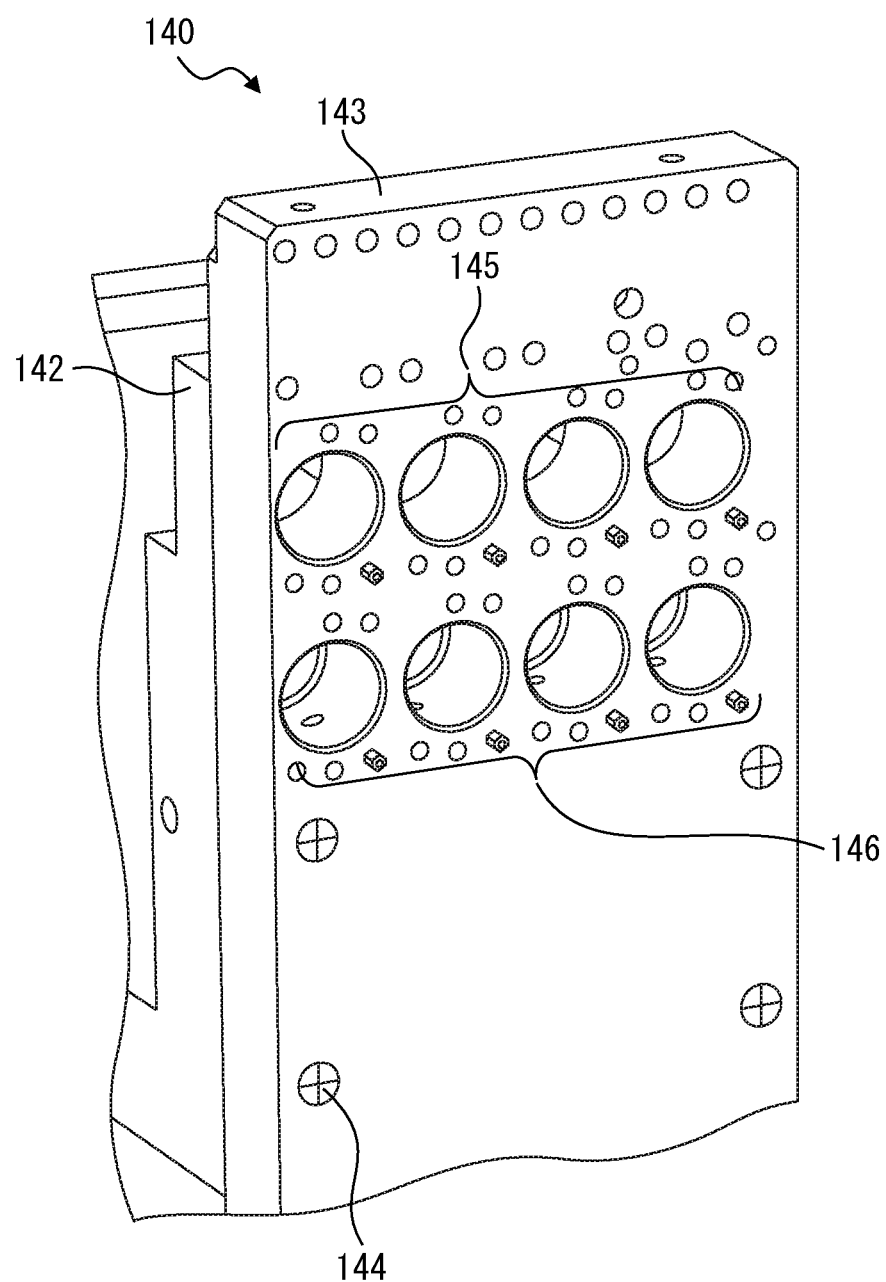
FIG. 12 is a partial perspective view of the rear tool holding part without the rear tool holding device shown in FIG. 5 being mounted thereon.
Figure 13:
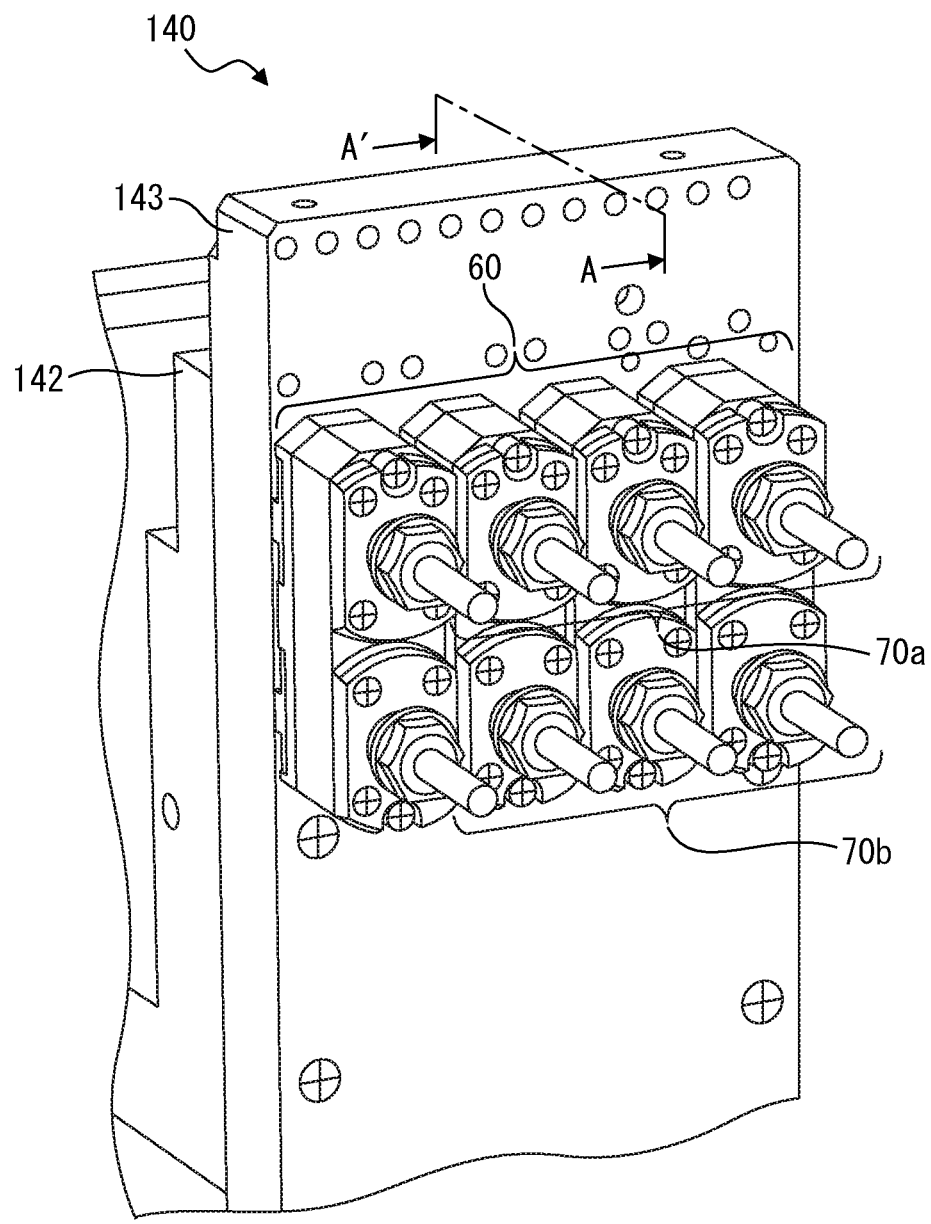
FIG. 13 is a partial perspective view of the rear tool holding part with the rear tool holding device shown in FIG. 5 being mounted thereon.

FIG. 12 is a partial perspective view of the rear tool holding part 140 without the rear tool holding devices 60 being mounted thereon; FIG. 13 is a partial perspective view of the rear tool holding part 140 with the rear tool holding devices 60 being mounted thereon.

The rear board 143 has four through holes 145 and four blind holes 146. The four through holes 145 are cylindrical holes extending from one surface to the other surface of the rear board 143. The surface of the rear base 142 facing the through holes 145 has recesses. The four blind holes 146 are cylindrical recesses having circular bottom surfaces.

Each of the four rear tool holding devices 60 is attached to the rear tool holding part 140 by being fastened to the rear tool holding part 140 with fastening members, such as screws, with the first projection 615 and the second projection 616 being housed in the corresponding through hole 145 and blind hole 146, respectively. Each of the four rear tool holding devices 60 holds the first rotary tool 70a and the second rotary tool 70b at positions corresponding to the through hole 145 and the blind hole 146, respectively.

Figure 14:
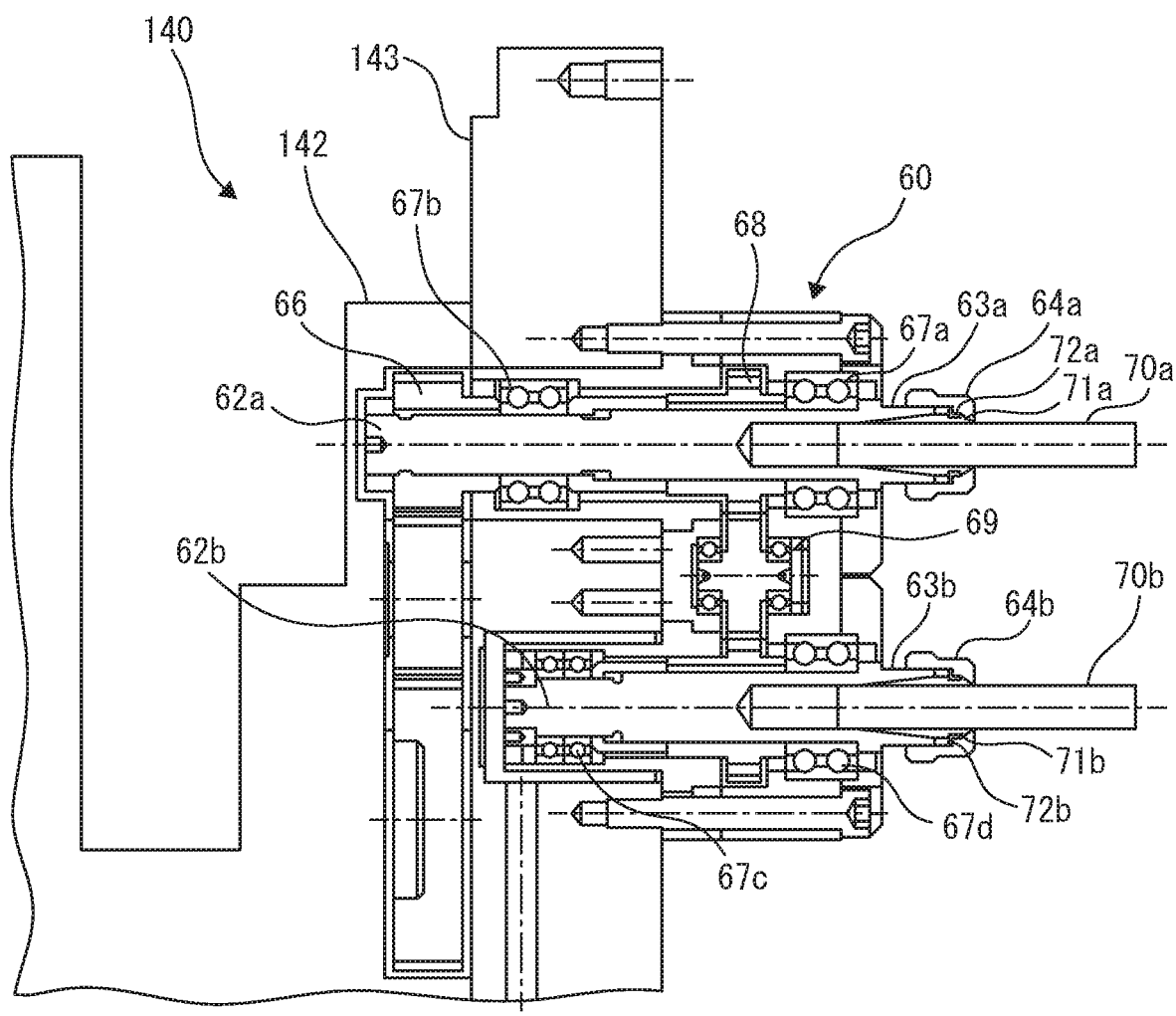
FIG. 14 shows a cross section taken along line A-A' in FIG. 13.

FIG. 14 shows a cross section taken along line A-A' in FIG. 13.

Since the rear tool holding devices 60 in the machine tool 2 are the same as those in the machine tool 1, except that they are held by the rear tool holding part 140 instead of the rear tool stand 50, detailed description thereof is omitted herein.

Although the rear tool holding devices 60 in the described embodiment are tool holding devices used for machining a workpiece held by a rear spindle, the tool holding device according to the embodiment may be a front tool holding device used for machining a workpiece held by a front spindle.

In the rear tool holding devices 60 of the described embodiment, the second shaft 62b rotating in response to rotation of the first shaft 62a is disposed below the first shaft 62a having one end at which the driving-force input unit 66 is disposed. However, in the tool holding device according to the embodiment, the second shaft rotating in response to rotation of the first shaft may be disposed above the first shaft having one end at which the driving-force input unit is disposed.

What is claimed is:

1. A tool holding device comprising:
   a first shaft having one end at which a first tool holding part is disposed;
   a second shaft having one end at which a second tool holding part is disposed;
   a first bearing holding the first shaft rotatably;
   a second bearing disposed between the first tool holding part and the first bearing, the second bearing holding the first shaft rotatably;
   a third bearing holding the second shaft rotatably;
   a fourth bearing disposed between the second tool holding part and the third bearing, the fourth bearing holding the second shaft rotatably;
   a casing housing the first shaft, the second shaft, the second bearing and the fourth bearing;
   a first projection projecting from the casing and housing the first bearing;
   a second projection projecting from the casing and housing the third bearing; and
   a rotation transmitting unit that rotates the second shaft in response to rotation of the first shaft;
   wherein the first projection has a longer length than the second projection.

2. The tool holding device according to claim 1, further comprising:
   a driving-force input unit rotating the first shaft by driving force being inputted.

3. A machine tool comprising:
   a driving-force output unit outputting driving force;
   a tool holding stand having a first recess and a second recess; and a tool holding device according to claim 1, engaged with the tool holding stand and holding a plurality of rotary tools.

\* \* \* \* \*